United States Patent [19]
Carbonell et al.

[11] Patent Number: 5,695,647
[45] Date of Patent: Dec. 9, 1997

[54] METHODS OF TREATING WASTEWATER

[75] Inventors: Ruben G. Carbonell; Li Ang Chen, both of Raleigh; George A. Serad, Charlotte, all of N.C.

[73] Assignees: North Carolina State University, Raleigh; Hoechst Celanese Corporation, Charlotte, both of N.C.

[21] Appl. No.: 635,445

[22] Filed: Apr. 19, 1996

[51] Int. Cl.⁶ .................................................. C02F 1/56
[52] U.S. Cl. ...................... 210/724; 210/725; 210/728; 210/730; 210/733; 210/745; 210/754; 210/764; 210/908
[58] Field of Search .................................. 210/723, 724, 210/725, 728, 729, 730, 732, 733, 745, 754, 764, 908

[56] References Cited

U.S. PATENT DOCUMENTS

| | | | |
|---|---|---|---|
| 4,047,862 | 9/1977 | Keith | 425/8 |
| 4,192,838 | 3/1980 | Keith et al. | 264/10 |
| 4,283,186 | 8/1981 | Keith et al. | 493/42 |
| 4,559,143 | 12/1985 | Asada et al. | 210/778 |
| 4,710,298 | 12/1987 | Noda | 210/505 |
| 4,744,904 | 5/1988 | McAninch et al. | 210/632 |
| 4,790,943 | 12/1988 | Dunn et al. | 210/705 |
| 4,933,087 | 6/1990 | Markham, Jr. et al. | 210/626 |
| 4,966,713 | 10/1990 | Keys et al. | 210/705 |
| 5,071,599 | 12/1991 | McNair, Jr. et al. | 264/5 |
| 5,174,903 | 12/1992 | Miller | 210/725 |
| 5,175,276 | 12/1992 | McNair, Jr. et al. | 536/58 |
| 5,195,465 | 3/1993 | Webb et al. | 119/172 |
| 5,204,007 | 4/1993 | Mosley et al. | 210/705 |
| 5,213,883 | 5/1993 | Mehta | 428/224 |
| 5,277,368 | 1/1994 | Kindig | 209/211 |
| 5,277,814 | 1/1994 | Winter et al. | 210/604 |
| 5,298,430 | 3/1994 | Myers, Jr. et al. | 436/530 |
| 5,316,705 | 5/1994 | McNair, Jr. et al. | 264/5 |
| 5,340,483 | 8/1994 | Payne et al. | 210/632 |
| 5,382,356 | 1/1995 | Thogho et al. | 210/709 |
| 5,413,720 | 5/1995 | Miller | 210/725 |
| 5,427,650 | 6/1995 | Holloway | 162/5 |
| 5,429,741 | 7/1995 | Webb et al. | 210/242.4 |
| 5,433,865 | 7/1995 | Laurent | 210/727 |
| 5,449,464 | 9/1995 | El-Shall | 210/727 |
| 5,451,326 | 9/1995 | Carlson et al. | 210/708 |
| 5,458,780 | 10/1995 | Evans | 210/634 |
| 5,569,385 | 10/1996 | O'Carroll et al. | 210/727 |

OTHER PUBLICATIONS

J. E. Smith; Cellulose acetate fibrets: a fibrillated pulp with high surface area, *Tappi J.* pp. 185–187 (1988).

*Primary Examiner*—Neil McCarthy
*Attorney, Agent, or Firm*—Bell, Seltzer, Park & Gibson

[57] ABSTRACT

The present invention provides methods of treating or clarifying a turbid wastewater containing at least one contaminant selected from the group consisting of proteinaceous materials, fats, oils, and other biological contaminants. The methods of the present invention include the steps of (a) contacting turbid wastewater to cellulose ester fibrets under conditions sufficient to flocculate the contaminant to form a treatment suspension, and then (b) separating the flocculants from the treatment suspension to provide a clarified wastewater.

55 Claims, 6 Drawing Sheets

METHODS OF TREATING WASTEWATER

FIELD OF THE INVENTION

The present invention relates to methods of treating wastewater, and in particular to methods of treating wastewater containing contaminants including proteinaceous materials, fats, oils, and/or other biological contaminants.

BACKGROUND OF THE INVENTION

Wastewaters, such as those including proteinaceous materials, fats, and/or oils have presented an environmental problem for several years. Food processing plants in particular, generate large quantities of wastewater which must be treated prior to release. Often, due to the nature of the wastewater produced from food processing plants, large quantities of wastewater must be disposed of rather than treated and released into the environment.

Processing water from food processing plants, including poultry processing, pork processing, cattle slaughter houses, rendering plants, seafood processing plants, mill processing plants, whey processing plants, and the like all discharge wastewater having contaminants such as proteinaceous materials, fats, oils, biological contaminants, and mixtures thereof. Water is employed in these plants in a variety of functions, including rinsing and cleanup which flushes loose meat, blood, soluble protein, inorganic particles, and other wastes into the drain where it contaminates the water. These wastewaters cannot be released into the environment without significant treatment measures to remove the proteinaceous materials, fats, oils, and other biological contaminants. Disposal, without reclamation, of such wastewaters is disadvantageous not only because of the environmental impact of filling landfills with large volumes of wastewater, but also because the proteinaceous materials, fats and oils in the wastewater may be reused, for example in animal feeds, if they can be reclaimed from the wastewater.

The development of new techniques for the efficient removal of proteinaceous materials, fats, oils, and other biological contaminants from wastewater has been ongoing for many years. A typical, conventional process for removing proteins, fats, oils, and other biological contaminants from poultry processing wastewater involves physical screening to remove larger particles, chemical flocculation to remove colloidal and suspended solids, biological treatment to digest dissolved organic matter (usually accomplished with aerobic and anaerobic digestion systems), and chlorination to kill remaining pathogens. After chlorination, the treated wastewater is usually discharged into a river.

Current wastewater treatment techniques have a number of disadvantages. For example, a typical poultry processing plant utilizes approximately 2.8 million gallons of water per day, a significant portion of which is necessarily discarded with the colloidal and suspended solids removed in the chemical flocculation step. Typically, the skimmings from the chemical flocculation are comprised of 90–95% water. This represents a substantial volume and weight of water that must be transported to a disposal site and disposed of. In addition, many of chemical flocculating agents conventionally utilized do not of do not have "generally recognized as safe" (GRAS) approval for animal feed. Therefore the chemical flocculation skimmings composed of proteins, fats, and oils cannot be utilized as animal feeds due to contamination with the flocculating agents. The aerobic and anaerobic lagoons necessary for the biological treatment of the water generate odors which are aesthetically and environmentally undesirable. Aerobic digestion lagoons are difficult to control, and run-off of untreated effluent to local water supplies can occur.

In light of these disadvantages, there remains a need in the art for new methods of treating wastewater. In particular, there remains a need in the art for new methods of removing proteinaceous materials, fats, oils, and other biological agents. Accordingly, it is an object of the present invention to provide methods of removing contaminants such as proteinaceous materials, fats, oils, and other biological contaminants from wastewater.

SUMMARY OF THE INVENTION

As a first aspect, the present invention provides a process for clarifying a turbid wastewater containing at least one contaminant selected from the group consisting of proteinaceous materials, fats, oils, and biological contaminants. The process comprises (a) contacting the turbid wastewater to cellulose ester fibrets under conditions sufficient to flocculate the contaminant to form a flocculant-containing treatment suspension, and then (b) separating the flocculants from the treatment suspension to provide a clarified wastewater.

As a second aspect, the present invention provides a process for clarifying a turbid wastewater containing at least one contaminant selected from the group consisting of proteinaceous materials, fats, oils, and biological contaminants. The process comprises (a) contacting the turbid wastewater to a mixture of cellulose ester fibrets and a polyelectrolyte, under conditions sufficient to flocculate the contaminant to form a flocculant-containing treatment suspension, and then (b) separating the flocculants from the treatment suspension to provide a clarified wastewater.

As a third aspect, the present invention provides a process for removing a contaminant selected from the group consisting of proteinaceous materials, fats, oils, biological contaminants and mixtures thereof from food processing wastewater. The method comprises (a) contacting the wastewater to a mixture of cellulose ester fibrets and a polyelectrolyte to form a flocculant-containing treatment suspension, and then (b) separating the flocculants from the treatment suspension to remove the contaminants from the wastewater.

The foregoing and other objects and aspects of the present invention are explained in detail in the detailed description set forth below.

BRIEF DESCRIPTION OF THE DRAWINGS

FIG. 11 is a graphical representation of the percent light transmission of clarified wastewater filtrates produced by contacting the wastewater with varying amounts of cellulose acetate fibrets and varying amounts of carboxymethyl cellulose. The percent light transmission is plotted against the dosage in grams per total grams of protein in the wastewater sample. In this graph, "→←" represents the initial protein concentration at pH 4.0 of the wastewater prior to treatment; "—+—" represents the control sample; "...o..." represents CMC concentration of zero (or cellulose acetate fibrets only); "...●..." represents cellulose acetate fibrets+0.13 g CMC per gram initial protein; "—Δ—" represents cellulose acetate fibret concentration of zero (or CMC only); and "—▲—" represents CMC+0.6 g cellulose acetate fibrets per gram initial protein.

FIG. 12 is a graphical representation of the protein concentration of clarified wastewater filtrates produced by contacting the wastewater with varying amounts of cellulose acetate fibrets and varying amounts of carboxymethyl cellulose. The protein concentration (mg/l) is plotted against the dosage in grams per total grams of protein in the wastewater sample. In this graph "→←" represents the initial protein concentration at pH 4.0 of the wastewater prior to treatment; "—+—" represents the control sample; "...o..." represents CMC concentration of zero (or cellulose acetate fibrets only); "...●..." represents cellulose acetate fibrest+0.13 g CMC per gram initial protein; "—Δ—" represents cellulose acetate fibrets concentration of zero (or CMC only); and "—▲—" represents CMC+0.6 g cellulose acetate fibrets per gram initial protein.

DETAILED DESCRIPTION OF THE INVENTION

As used herein, the term "wastewater" has its conventional meaning in the art. Wastewaters which may be treated and clarified by the methods of the present invention include any waters containing one or more contaminants. Such waters may be generated in a variety of commercial processes including but not limited to food processing, rendering, chemical manufacturing and processing, pharmaceutical industries, mining of natural resources, and a variety of other industrial activities. In addition, the methods of the present invention are useful for the treatment and clarification of municipal wastewaters. The methods of the present invention are useful for removing proteinaceous materials, fats, oils, biological contaminants such as microorganisms, or any combinations or mixtures thereof which are typically present in wastewater.

The methods of the present invention are useful in particular for the treatment and clarification of food processing and municipal wastewaters. The food processing wastewaters which may be treated and clarified by the methods of the present invention include but are not limited to meat processing wastewaters, such as poultry processing wastewaters, cattle slaughterhouse wastewaters, hog slaughterhouse wastewaters, and seafood processing wastewaters; dairy wastewaters, including but not limited to mill processing wastewaters, and cheese processing wastewaters; whey processing wastewaters; fruit and vegetable processing wastewaters including potato processing wastewaters, soya bean processing wastewaters, canning wastewaters, and juicing wastewaters; grain processing wastewaters; bakery wastewaters; distillation and fermentation wastewaters; margarine processing wastewaters; and the like. In one preferred embodiment, the present invention provides a method of removing proteinaceous materials, fats, oils, and/or biological contaminants such as microorganisms from poultry processing wastewater. In another preferred embodiment, the present invention provides a method of removing proteinaceous materials from potato processing wastewater.

The wastewaters which are treated and clarified according to the methods of the present invention are typically turbid wastewaters. As used herein, the phrase "turbid wastewater(s)" refers to wastewater having particles and/or contaminants of various types suspended, dissolved, or otherwise contained therein. Turbid wastewater may be discolored, although it is not required. Turbid wastewater may contain a variety of particles and/or contaminants which are desirously removed by practicing the methods of the present invention. Specific examples of particles and/or contaminants which may be present in wastewaters of the present invention will depend upon the source of the wastewater. For example, particles and contaminants present in meat processing wastewaters include but are not limited to proteinaceous materials, fats, oils, biological contaminants including microorganisms, pieces of flesh, bone, hair, feathers, shell, dirt, fecal matter, and other organic and inorganic materials. The phrase "biological contaminants" as used herein has its generally accepted meaning in the art. Specific biological contaminants include microorganisms of many varieties, and other contaminants which will be readily apparent to those skilled in the art. As a further specific example, particles and contaminants present in potato processing wastewaters include but are not limited to dirt, pieces of potato, leaves, and proteins. Particles and contaminants in each of the remaining wastewaters described hereinabove will be readily apparent to those skilled in the art and may be easily determined with routine analysis of wastewater samples.

As used herein, the term "clarified wastewater(s)," refers to wastewaters which are produced by the methods of the present invention, and which are characterized in that such wastewaters contain fewer particles and/or contaminants than the turbid wastewaters from which they are generated. The precise composition of the clarified wastewaters produced by the methods of the present invention will differ depending upon the content of the turbid wastewater from which it is produced, as will be appreciated by those skilled in the art. Typically, the clarified wastewaters which are produced by the methods of the present invention are substantially free of particles and/or contaminants, and are typically clear and colorless.

As will be appreciated by those skilled in the art, a number of widely recognized tests can be utilized to determine the quantity of particles and/or contaminants in a wastewater. Such tests include but are not limited to tests of biological oxygen demand (BOD), tests of chemical oxygen demand (COD), tests for total Kjehldal nitrogen, tests for total protein, tests for total suspended solids, tests for ammonia, tests for oils and greases, tests for total fecal coliforms, and simply a visual inspection for visible suspended or precipitated particles. Similarly, widely recognized tests for evaluating color and clarity of a solution include but are not limited to optical density, absorption, and percent light transmission.

Preferably, the clarified wastewaters produced by the methods of the present invention are characterized in that they are substantially free of visible particles. In one embodiment, the clarified wastewaters produced by the methods of the present invention are characterized in that they exhibit an optical density of not more than about 0.9, preferably not more than about 0.5, more preferably not more than about 0.4, and most preferably not more than about 0.15. In one preferred embodiment, the clarified wastewater of the present invention is characterized in that it exhibits an optical density of 0.14 or less. In one embodiment, the clarified wastewater produced by the methods of the present invention can be characterized in that it exhibits a percent light transmission of greater than about 40%, preferably greater than about 60%, more preferably greater than about 70%, and most preferably greater than about 80%. In one preferred embodiment, of the invention, the clarified wastewater has a percent light transmission of 87% or higher. In one embodiment, the clarified wastewater of the present invention is characterized in that it has a protein content of about 1000 mg/l or less, preferably about 100 mg/l or less, more preferably about 50 mg/l or less, and most preferably about 30 mg/l or less. In one preferred embodiment, the clarified wastewater of the present invention has a protein content of 10 mg/l or less. Clarified wastewaters produced by the methods of the present invention need not exhibit all of the foregoing characteristics, but may be characterized by at least one, and typically a combination of two or more of the foregoing characteristics.

According to the methods of the present invention, turbid wastewaters may be clarified by (a) contacting the turbid wastewater to cellulose ester fibrets under conditions sufficient to flocculate the contaminants within the turbid wastewater to form a treatment suspension, and then (b) separating the flocculants from the treatment suspension to provide a clarified wastewater.

The cellulose ester fibrets which are contacted to the turbid wastewater may be comprised of any suitable cellulose ester fibrets. The term "fibret" has its conventional, industry meaning. Fibrets are highly fibrillated, high surface-area materials which are produced as a by-product in the production of cellulose ester products such as cellulose ester tow. Typically, the surface area of fibrets is about 20 $m^2/g$. Fibrets differ from fibers by virtue of their size, and their highly fibrillated character. Cellulose triacetate fibrets are typically oblong particles formed of an agglomeration of film-like ribbons. When dispersed in a dilute aqueous medium, the fibrets turn into loose and highly swollen fibrillated structures, ranging from about 5 to about 60 μm in width and about 100 to about 600 μm in length. Cellulose acetate fibrets are typically fibrous with a length ranging from about 20 to about 200 μm, and a diameter ranging from about 0.5 to about 5 μm.

Cellulose ester fibrets are known, and can be produced according to known techniques. For example, fibrets may be produced by the processes described in U.S. Pat. Nos. 5,071,599, 5,175,276, and 5,316,705 all to McNair Jr. et al., the disclosures of which are hereby incorporated by reference in their entirety. Fibrets have previously been employed in the manufacture of tobacco smoke filters, and in paper opacification techniques.

The cellulose ester fibrets employed in the methods of the present invention may be comprised of cellulose acetate, cellulose triacetate, cellulose acetate butyrate, benzyl cellulose, and mixtures thereof. Currently, the preferred cellulose ester fibrets are cellulose acetate or cellulose triacetate fibrets. These materials present the distinct advantage that they are GRAS approved by the Food and Drug Administration for contact with food. As such the contaminants removed from the wastewaters according to the methods of the present invention may advantageously be utilized as valuable and economical animal feed additives, without the necessity of separating the contaminants from the fibrets prior to utilization in animal feed materials. Furthermore, for disposal purposes, the cellulose ester fibrets present the distinct advantage of being relatively quick drying so that unlike conventional flocculating agents, the cellulose ester fibrets and contaminants which are removed from the turbid wastewater do not retain large volumes of water and are lightweight. Thus, transportation and disposal of the particles removed form the treatment suspension is facilitated.

The cellulose ester fibrets may be contacted to the turbid wastewater according to any suitable method known to those skilled in the art. The cellulose ester fibrets must be contacted to the wastewater so as to flocculate one or more of the contaminants in the turbid wastewater. An example of one method of contacting the cellulose ester fibrets to the turbid wastewater includes combining the cellulose ester fibrets and the turbid wastewater in a vessel. A second example of a method of contacting the cellulose ester fibrets to the turbid wastewater includes admixing the cellulose ester fibrets and the turbid wastewater. The cellulose ester fibrets and turbid wastewater may be admixed according to any suitable method know to those skilled in the art including stirring, shaking, or aeration.

The amount of cellulose ester fibrets to be contacted to the turbid wastewater will vary depending in part upon the type and amount of contaminants present in the turbid wastewater. The amount of fibrets can range between about 1 mg/l, 10 mg/l, 100 mg/l, or 1000 mg/l up to about 10 g/l or even up to about 45 g/l of turbid wastewater. Typically the amount of cellulose ester fibrets contacted with the turbid wastewater is between about 6 mg/l and about 1000 mg/l up to about 20 g/l of turbid wastewater. Preferably the amount of cellulose ester fibrets is about 60 mg/l and about 1000 mg/l up to about 10 g/l of turbid wastewater, more preferably between about 100 mg/l and about 1000 mg/1, and most preferably between about 200 mg/l and about 300 mg/l of turbid wastewater. In one embodiment, the amount of cellulose ester fibrets is between about 100 mg/l and about 400 mg/l.

In one embodiment of the present invention, the step (a) of contacting the cellulose ester fibrets to the turbid wastewater comprises contacting the wastewater to a combination of cellulose ester fibrets and a polyelectrolyte. The inclusion of the polyelectrolyte may advantageously facilitate further flocculation of contaminants in the turbid wastewater. Suitable polyelectrolytes which may be employed in the methods of the present invention to assist in the flocculation of contaminants will be readily apparent to those skilled in the art, and are generally readily available. For example, suitable polyelectrolytes include but are not limited to polymers containing cationic or anionic functional groups, such as carboxymethyl cellulose, polyacrylic acid, and chitosan. Currently, the preferred polyelectrolyte for use in the present invention is carboxymethyl cellulose. According to one preferred embodiment of the present invention, step (a) includes contacting the turbid wastewater to a combination of cellulose acetate fibrets and carboxymethyl cellulose. According to another preferred embodiment of the present invention, step (a) includes contacting the turbid wastewater to a combination of cellulose triacetate fibrets and carboxymethyl cellulose.

When used in combination, the cellulose ester fibrets and carboxymethyl cellulose may be contacted to the wastewater by separately adding each to the turbid wastewater or, alternatively the fibrets may be combined with the carboxymethyl cellulose prior to the step of contacting with the turbid wastewater. In one embodiment of the invention, the fibrets are coated with carboxymethyl cellulose prior to the step of contacting with the turbid wastewater. Carboxymethyl cellulose coated fibrets may be preferred for in some embodiments of the present invention, but they are not required for carrying out the methods of the present invention.

In the embodiments of the invention wherein cellulose ester fibrets are employed in combination with polyelectrolyte, the amount of polyelectrolyte and cellulose ester fibrets which are contacted to the turbid wastewater will depend in part upon the contaminants present in the turbid wastewater. Typically, the polyelectrolyte is employed in an amount of between about 0.1 mg/l or about 100 mg/l up to about 1000 mg/l or even up to about 10 g/l of turbid wastewater. Preferably, the amount of polyelectrolyte is between about 1 mg/l and 100 mg/l up to about 1000 mg/l of turbid wastewater. More preferably, the amount of polyelectrolyte is between about 10 mg/l up to about 100 mg/l of turbid wastewater. In one embodiment, the amount of polyelectrolyte is between about 20 mg/l and about 60 mg/l. When polyelectrolyte is employed, cellulose ester fibrets can be employed in an amount of between about 1 mg/l, 10 mg/l, 100 mg/l, or 1000 mg/l up to about 10 g/l or even up to about 45 g/l of turbid wastewater. Typically, the amount of cellulose ester fibrets is between about 6 mg/l and about 100 mg/l up to about 20 g/l, preferably between about 60 mg/l and about 1000 mg/l up to about 10 g/l, and most preferably between about 200 mg/l and about 300 mg/l of turbid wastewater. In one preferred embodiment, the amount of polyelectrolyte employed is between about 20 mg/l and about 40 mg/l of turbid wastewater and the amount of cellulose ester fibrets employed is between about 100 mg/l and about 400 mg/l of turbid wastewater.

The inventors have unexpectedly discovered that the combination of cellulose ester fibrets and polyelectrolytes improves the flocculation of the contaminants from the turbid wastewater. Although the combination of these elements is not required for effective clarification of wastewaters, the interaction of the combination of cellulose ester fibrets and polyelectrolytes may be advantageous for use in wastewaters containing large amounts of solubilized contaminants such as proteins. In addition, the combination of the cellulose ester fibrets and polyelectrolytes may also be economically advantageous as smaller amounts of each component may be capable of treating an equivalent amount of wastewater when cellulose ester fibrets and polyelectrolytes are used in combination.

In another embodiment of the present invention, the step (a) of contacting the cellulose ester fibrets to the turbid wastewater comprises contacting the wastewater to a combination of cellulose ester fibrets and salt. The inclusion of salt may advantageously facilitate further flocculation of contaminants in the turbid wastewater. Suitable salts include ammonium sulfate, sodium chloride, potassium chloride, sodium sulfate, potassium sulfate, sodium acetate, magnesium chloride, magnesium sulfate, and calcium chloride. The amount of salt contacted to the turbid wastewater in combination with the cellulose ester fibrets will vary depending upon the type and amount of contaminants in the turbid wastewater to be clarified, and the particular salt selected. Salt may be employed in the step (a) of contact in an amount of up to 100% saturation of the turbid wastewater. The inclusion of salt may be effective in some wastewaters to enhance flocculation of the contaminants, but is not preferred in embodiments wherein the clarified wastewater is to be discharged to a natural water source such as a river for environmental reasons.

The conditions which are sufficient to flocculate the contaminants in the turbid wastewater will depend upon the particular contaminants present in a given sample of wastewater, and are readily discernable by those skilled in the art. Typically, sufficient conditions for flocculation include ambient temperature and pressure. Stirring, shaking or otherwise mixing of the cellulose ester fibrets and the turbid wastewater may be advantageous, and is often preferred. Typically, the turbid wastewater is contacted to the cellulose ester fibrets, and optionally the polyelectrolyte or salt, for a period of time sufficient to generate a treatment suspension including flocculated materials in the wastewater. The amount of time required to generate the treatment suspension is dependent upon a variety of factors which may include the particular contaminants to be flocculated, the particular cellulose ester fibrets selected, the pH of the wastewater, the presence or absence of a polyelectrolyte or salt, the presence or absence of shaking or mixing, and other factors known to those skilled in the art. Typically, the amount of time necessary to generate the treatment suspension is between about 1 minute and about 12 hours, preferably between about 30 minutes and about 3 hours, and more preferably between about 1 hour and about 2 hours. In one embodiment, the turbid wastewater is contacted with cellulose ester fibrets with shaking and/or stirring, for two hours.

In addition, it is known in the art that adjusting the pH of wastewater, particularly wastewater containing proteinaceous material contaminants, can advantageously promote flocculation of the solubilized contaminants. By adjusting the pH of the wastewater, it is possible to alter the ionic charge on the proteins in the wastewater, and ideally provide a charge which is more attractive to the flocculating agents. Thus, as a further aspect of the present invention, the methods of the present invention may also include the step of altering the pH of the wastewater prior to step (a) of contacting the wastewater to the cellulose ester fibrets, to adjust the ionic charge of proteinaceous material contaminants. The direction of alteration, i.e., to a higher or a lower pH, will depend upon the ionic character of the cellulose ester fibrets and the ionic charge of the polyelectrolyte, if present. In one embodiment of the invention, the pH of the turbid wastewater is raised to provide a negative charge on the proteinaceous materials in the wastewater. The pH may be raised from between about 0.5 and about 8 pH units, preferably between about 1 and about 2 pH units prior to contacting the turbid wastewater to the cellulose ester fibrets. In another embodiment, the pH of the turbid wastewater is lowered to provide a positive charge on the proteinaceous materials in the wastewater. The pH may be lowered from between about 0.5 and about 8 pH units, preferably between about 1 and about 2 pH units prior to contacting the turbid wastewater to the cellulose ester fibrets. In one embodiment, the pH of the of the turbid wastewater is lowered to not more than about 5.0 prior to contacting the turbid wastewater to the cellulose ester fibrets. In one preferred embodiment, the pH of the turbid wastewater is lowered to about 4.0 prior to contacting the turbid wastewater to the combination of cellulose triacetate fibrets and carboxymethyl cellulose. By lowering the pH of the turbid wastewater in this embodiment, flocculation may be enhanced by taking advantage of the physical attraction between the negatively charged carboxymethyl cellulose polyelectrolyte and the positively charged proteinaceous materials.

The formation of the flocculated materials or flocculants in the wastewater upon contact with the cellulose ester fibrets, and optionally the polyelectrolyte or salt, produces a flocculant-containing treatment suspension wherein the flocculated materials may be suspended in the wastewater or may even precipitate or settle out of the wastewater. The flocculants may then be separated from the treatment suspension by any suitable separation method known to those skilled in the art. For example, the flocculants may be separated from the treatment suspension by filtering the treatment suspension to provide the clarified wastewater. Suitable filtration techniques are known to those skilled in the art and include conventional filtration techniques. For example, suitable filtration techniques for separating the flocculants from the treatment suspension include gravitational filtration and vacuum filtration. Although more elaborate separation systems or techniques may certainly be employed for the purpose of separating the flocculants from the treatment suspension, gravitation and vacuum filtration are advantageously inexpensive and simple to carry out. The filtration should be carried out using a filter of suitable pore size to allow the wastewater to pass through while preventing the passage therethrough of the flocculants produced during the contacting step. Ideally, a suitable filter will permit the relatively quick filtration of the wastewater, while efficiently retaining the flocculants produced during the contacting step. Quick filtration of the wastewater is advantageous because of the large amount of wastewater which is generated from typical wastewater generating processes and must be clarified. Obviously the faster the separation step, the more wastewater can be treated in a given period of time. A filter of suitable pore size will be readily determinable by those skilled in the art. Typically, a filter having a pore size between about 20 μm and about 17 μm is sufficient for relatively quick and efficient filtration of the treatment suspension.

The flocculants obtained by the separation step include the flocculated contaminants and the cellulose ester fibrets, and the polyelectrolyte or salt when it is employed. Advantageously, the cellulose ester fibrets are quick drying and do not retain large amounts of water, unlike conventional flocculating agents. The flocculants of fibrets and contaminants dries quickly, and may then be disposed of by known means. Because the fibrets do not retain large amounts of water and because the fibrets are relatively light weight, the disposal of the flocculants produced in the instant methods is typically easier and more economical than disposal of conventional wastewater flocculating agents.

As an alternative to disposal, the flocculants produced during the contacting step may advantageously be employed as an additive to animal feed, in the embodiments of the invention wherein the wastewater to be clarified includes contaminants which are not detrimental to animals. For example, in the embodiment wherein the wastewater is food processing wastewater, which may contain proteinaceous materials, fats, oils, and mixtures thereof, the flocculants obtained by the separation step may be utilized without further purification as a valuable, nutritional, and economical additive to animal feed. As noted above, the cellulose ester fibrets are GRAS approved for food contact, and therefore may be included in animal feeds. In addition, the proteinaceous materials, which are removed from the wastewater by the methods of the present invention are beneficial sources of protein for animals.

The clarified wastewater resulting after the separation step may be further processed or treated if desired, it may be discharged, or in some cases it may be recycled back into the processing plant as "fresh" water. The desirability of further processing of the clarified wastewater will depend upon the nature of the wastewater which is clarified. For example, clarified potato processing wastewater typically need not be further processed or treated prior to recycling in the potato processing plant or discharge. Clarified poultry processing wastewater, on the other hand, is often desirously further treated to remove or reduce the number of microorganisms therein prior to discharge or recycling in the poultry processing plant.

Techniques for further processing or treating the clarified wastewater are known to those skilled in the art. For example, according to one embodiment of the invention, the clarified wastewater is subjected to chlorination to reduce the number of microorganisms present in the clarified wastewater prior to recycling or discharge to the environment. By "reducing the number of microorganisms," we mean that the chlorination step of this embodiment of the inventive methods may inhibit the growth of existing microorganisms, or destroy a portion of the microorganisms remaining after clarification, or destroy all of the microorganisms remaining after clarification. Generally, all that is required is to achieve an environmentally acceptable level of microorganisms prior to discharge or recycling. Destruction of all of the microorganisms is not required. For example, achieving a coliform content of 400 counts/100 ml in poultry processing wastewater is sufficient for discharge of the wastewater.

Similarly, the methods of the present invention may also include additional processing techniques prior to the step (a) of contacting the turbid wastewater to the fibrets. Although it is not essential to process the turbid wastewater prior to the contacting step, it may be beneficial in some embodiments. For example, in embodiments of the present invention wherein the turbid wastewater contains a significant number of large particles, it may be advantageous to remove the large particles prior to carrying out the methods of the present invention. Typically, meat processing wastewaters include pieces of bone, flesh, claws, hair, feathers, and the like which can easily be removed prior to carrying out the methods of the present invention, and thereby improving the efficiency of the clarification process. Larger particles, such as those described, may be easily removed using physical screening techniques well known to those skilled in the art. Such screening techniques typically include passing the turbid wastewater through a mesh screen having holes large enough to permit the relatively quick and easy passage of wastewater, while retaining only the larger size particles. Rotary screening techniques are common for this purpose, and are suitable for use with the methods of the present invention. The removal of the larger particles is advantageous for the efficient clarification of the turbid wastewater, and also because these particles may then be processed and utilized for other valuable functions, such as protein sources in animal feeds. Other processing techniques which may be employed prior to the contacting step will be readily apparent to those skilled in the art and are anticipated by the instant inventors.

The following examples are provided to illustrate the present invention, and should not be construed as limiting thereof. In these examples, "g" means grams, "mg" means milligrams, "l" means liters, "ml" means milliliters, "cc" means cubic centimeters, "g/l" means grams per liter, "mg/l" means milligrams per liter, "g/g" means grams per gram of initial protein in the wastewater, "mm" means millimeters, "nm" means nanometers, "µm" means micrometers, "° C." means degrees Centigrade, "%T" means percent Light Transmission, "CMC" means carboxymethyl cellulose, "BSA" means bovine serum albumin, "TSS" means total suspended solids, "TKN" means total Kjehldal nitrogen, "BOD" means biological oxygen demand, and "UV" means ultraviolet.

Wastewater samples were obtained from the Perdue commercial broiler processing plant, Lewiston, N.C., and transported in ice within 2.5 hours to the Bioseparations laboratory at North Carolina State University, Raleigh, N.C. As a control, samples of the discharge effluent after chlorination were also collected and transported to the lab. Cellulose acetate and cellulose triacetate fibrets were donated by Hoechst Celanese Corp., Charlotte, N.C. Carboxymethyl cellulose, average MW 250,000, degree of substituted 0.7 was obtained from Polysciences, Inc., Warrington, Pa. Ammonium sulfate, hydrochloric acid 1N and sodium hydroxide 1N were obtained from Fisher Scientific, Pittsburgh, Pa. in ACS grade. Water clarity is evaluated by absorbance readings at 500 nm using deionized water as a blank on a UV160 spectrophotometer from Shimadzu, Kyoto, Japan and is converted to percent light transmission. Protein concentration was evaluated using dye-binding assay, as described in M. M. Bradford, *Analytical Biochemistry* 72:248 (1976). Total suspended solids (TSS), ammonia, total Kjehldal nitrogen (TKN), oils and greases, total fecal coliforms, and biochemical oxygen demand (BOD) are evaluated using the Standard Methods for the Examination of Water and Wastewater from the American Public Health Association, 1992.

EXAMPLE 1

Effect of Salt Concentration

Figure 1:
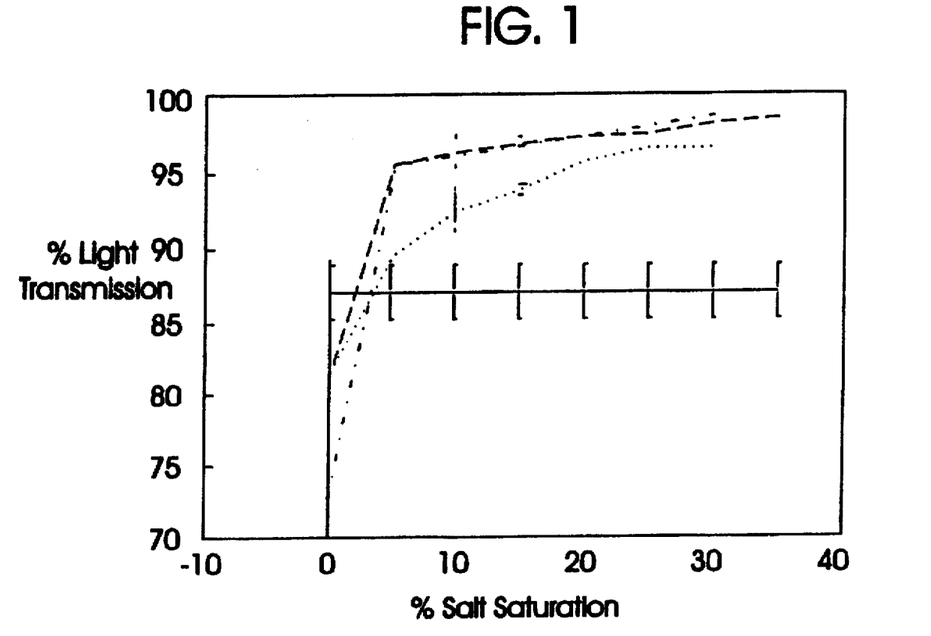
FIG. 1 is a graphical representation of the percent light transmission of clarified wastewater filtrates produced by treatment with cellulose triacetate fibrets and varying amounts of ammonium sulfate. Percent light transmission is plotted against percent salt saturation for filtrates produced at different temperatures. A control sample is also plotted for comparison. In this graph, "— —" represents filtrates prepared at 25° C.; "..." represents filtrates prepared at 40° C.; "—.—.—." represents filtrates prepared at 60° C.; and "—" represents the control sample.
Figure 2:
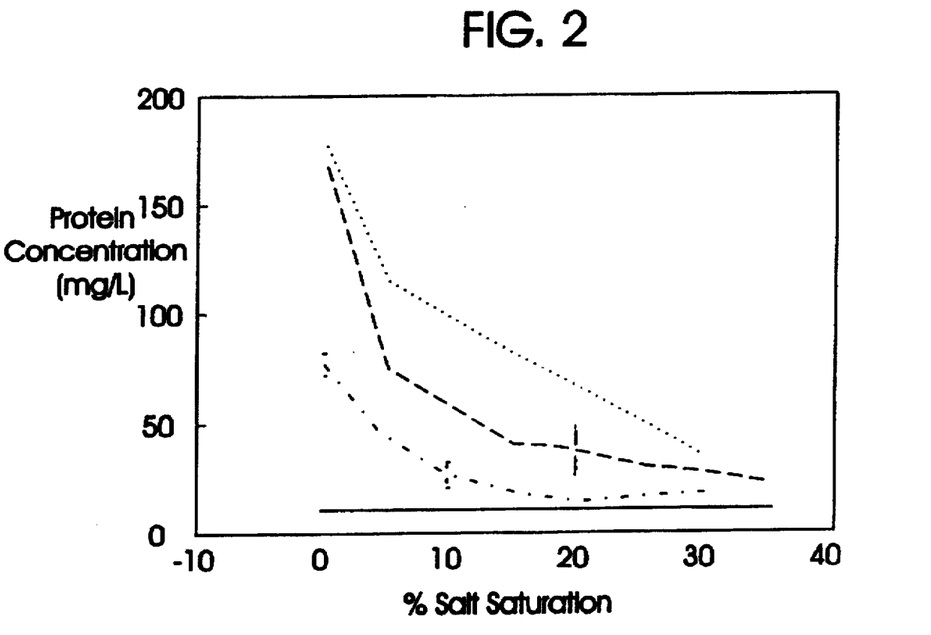
FIG. 2 is a graphical representation of the protein concentration of clarified wastewater filtrates produced by treatment with cellulose triacetate fibrets and varying amounts of ammonium sulfate. Protein concentration is plotted against percent salt saturation for filtrates produced at different temperatures. A control sample is also plotted for comparison. In this graph, "— —" represents filtrates prepared at 25° C.; "..." represents filtrates prepared at 40° C.; "—.—.—." represents filtrates prepared at 60° C.; and "—" represents the control sample.

Wastewater samples (3 ml) at pH 7.5 are contacted with 15 g/l cellulose triacetate fibrets and varying amounts of ammonium sulfate (100% saturation corresponds to 4.05M) and shaken for two (2) hours. The solution is then filtered under vacuum through a 20 µm polyethylene frit using 3 cc syringes. The filtrate obtained is evaluated for water clarity and protein content, and the effects of salt concentration and temperature are analyzed. The results obtained in water clarity testing are reported in FIG. 1. The results of protein concentration analysis are reported in FIG. 2.

The results demonstrate that a 5% salt saturation in the wastewater resulted in a filtrate with a %T at 25° C. of 95.47, which is higher than the value of the control, 86.82. The results further demonstrate that increasing the salt concentration and the temperature yields a lower protein concentration. At 20% salt saturation and 60° C., the protein concentration of the filtrate is 15.28 mg/l, which is close to the control value of 11.22 mg/l. The only constraint upon this method is that the addition of salts is not particularly desirable in the case of disposing the final effluent in local rivers.

EXAMPLE 2

Treatment with Fibrets and CMC

Figure 3:
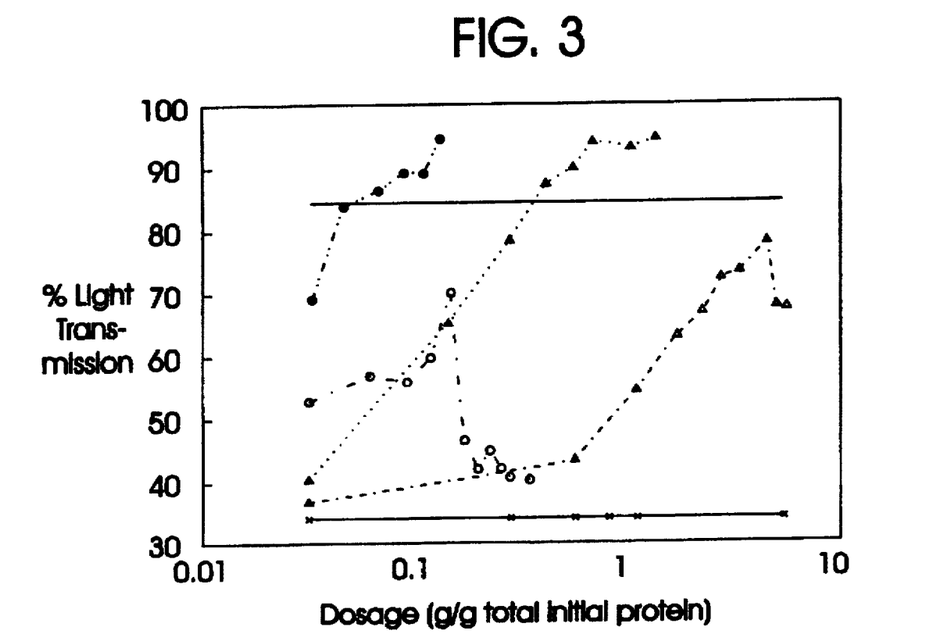
FIG. 3 is a graphical representation of the percent light transmission of clarified wastewater filtrates produced by contacting the wastewater to varying amounts of cellulose triacetate fibrets and varying amounts of carboxymethyl cellulose. The percent light transmission is plotted against the dosage in grams per total grams of protein in the wastewater sample. In this graph, "→←" represents the initial protein concentration at pH 4.0 of the wastewater prior to treatment; "—" represents the control sample; "—Δ—" represents CMC concentration of 0; "...Δ..." represents 0.13 g CMC per gram initial protein; "—o—" represents cellulose triacetate fibret concentration of 0; and "—●—" represents 0.74 g cellulose triacetate fibrets per gram initial protein.
Figure 4:
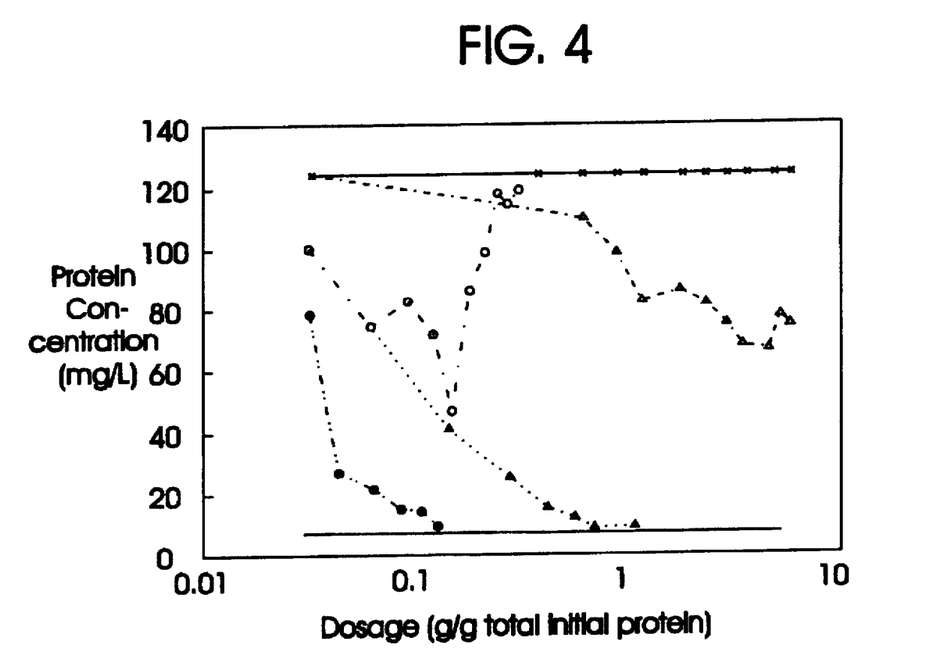
FIG. 4 is a graphical representation of the protein concentration of clarified wastewater filtrates produced by contacting the wastewater to varying amounts of cellulose triacetate fibrets and varying amounts of carboxymethyl cellulose. The protein concentration (mg/l) is plotted against the dosage in grams per total grams of protein in the wastewater sample. In this graph, "→←" represents the initial protein concentration at pH 4.0 of the wastewater prior to treatment; "—" represents the control sample; "—Δ—" represents CMC concentration of 0; "...Δ..." represents 0.13 g CMC per gram initial protein; "—o—" represents cellulose triacetate fibret concentration of 0; and "—●—" represents 0.74 g cellulose triacetate fibrets per gram initial protein.

Wastewater samples (3 ml) are adjusted to pH 4.0 by addition of 1N hydrochloric acid. The wastewater samples are then contacted with varying amounts of cellulose triacetate fibrets and varying amounts of CMC and shaken for two (2) hours. The solution is then filtered under vacuum through a 20 μm polyethylene frit using 3 cc syringes. The filtrate obtained is evaluated for water clarity, and protein content, and the effects of varying concentrations of fibrets and CMC are analyzed. The results obtained in water clarity testing are reported in FIG. 3. The results of protein concentration analysis are reported in FIG. 4.

The results indicate that treatment with fibrets or CMC alone did not produce %T or protein concentrations levels equivalent to the control. A dosage of 0.74 g/g (0.25 g/l) fibrets and 0.13 g/g (0.04 g/l) CMC produced water clarity and protein concentration levels equivalent to the control. The results further indicate that the application of fibrets alone improves water clarify of the final filtrate at high dosages, and can remove about 50% of the total protein present in solution. The application of CMC alone enhanced flocculation of solubilized proteins but the flocculants are not efficiently retained by the 20 μm pore filter. The simultaneous application of fibrets and CMC gave a result in which lower dosages of both fibrets and CMC achieved high performance results.

Although the instant inventors do not wish to be bound by any one theory of chemical interaction, it is currently believed that the mechanism of interaction of fibrets and contaminants is a combination of physical entrapment by and adsorption onto the fibrets. In addition, when the method is carried out in the presence of salts, salting out is also believed to play a role in the flocculation of the contaminants. When no salt is present, most of the suspended solids, including precipitated proteins are retained by the fibrets by adsorption and physical entrapment. Increasing the salt concentration increases removal of the dissolved proteins by salting out, promoting aggregation by a hydrophobic interaction and further adsorption of these molecules onto the fibrets. In the presence of a polyelectrolyte such as CMC, it is presently believed that small flocculants are formed by the interaction of solubilized proteins and CMC, and that these small flocculants are adsorbed onto the fibrets, and physically entrapped within the highly fibrillated micro structure of the fibrets. The adsorption and entrapment of these small flocculants by the fibrets results in bigger agglomerates that are retained by the 20 μm filter. Thus, the interaction of the fibrets and the polyelectrolyte for the removal of contaminants including solubilized proteins is currently believed to be the result of physical entrapment by the fibrets, adsorption onto the fibrets, and precipitation of the solubilized proteins by the polyelectrolyte. As noted above, the foregoing explanation is non-limiting of the invention, which is defined solely by the claims set forth hereinbelow.

EXAMPLE 3
Regulatory Analysis

A wastewater sample (1000 ml) is adjusted to pH 4.0 by addition of 0.02N sulfuric acid. Initial protein concentration is estimated to be about 300 mg/l. The wastewater sample is then contacted with 1.5 g/g cellulose triacetate fibrets and 0.08 g/g CMC and stirred for two (2) hours. The solution is then filtered under vacuum through a 2.7 μm Whatman glass microfiber. The filtrate obtained is evaluated for TSS, ammonia, TKN, oils and greases, coliforms, and BOD. For coliforms analysis, a similar procedure is adopted using 50 ml samples and ethanol-sterilized glassware and material. The results are reported in Table 1 below in comparison with the control sample and the standardized limits.

TABLE 1

| Sample | TSS (mg/l) | Ammonia (mg/l) | TKN (mg/l) | Oils & greases (mg/l) | Coliforms (counts/100 ml) | BOD (mg/l) |
| --- | --- | --- | --- | --- | --- | --- |
| initial | 288 | 20.16 | n.a. | 607.2 | n.a. | 2582.5 |
| fibrets + CMC | 2.0 | 13.44 | 42.84 | 0.2 | 8700 | 189.2 |
| control | 16.0 | 0.74 | 5.40 | 0.3 | 0 | 9.3 |
| limit | 51.3 | 20.16 | n.a. | 17.95 | 400 | 28.6 | n.a.: not available.

These results demonstrate that practically all of the suspended solids, and the oils and greases have been removed by the treatment with fibrets in combination with CMC. TKN values are higher than the control, but no limit is available. Coliforms and BOD are higher than the set limits, but a chlorination process after treatment with fibrets and CMC will effectively eliminate residual levels. For BOD, although the set limit was not achieved, removal was about 90%, which could be considered as high efficiency.

EXAMPLE 4

Analysis of Flocculating Agents

Figure 5:
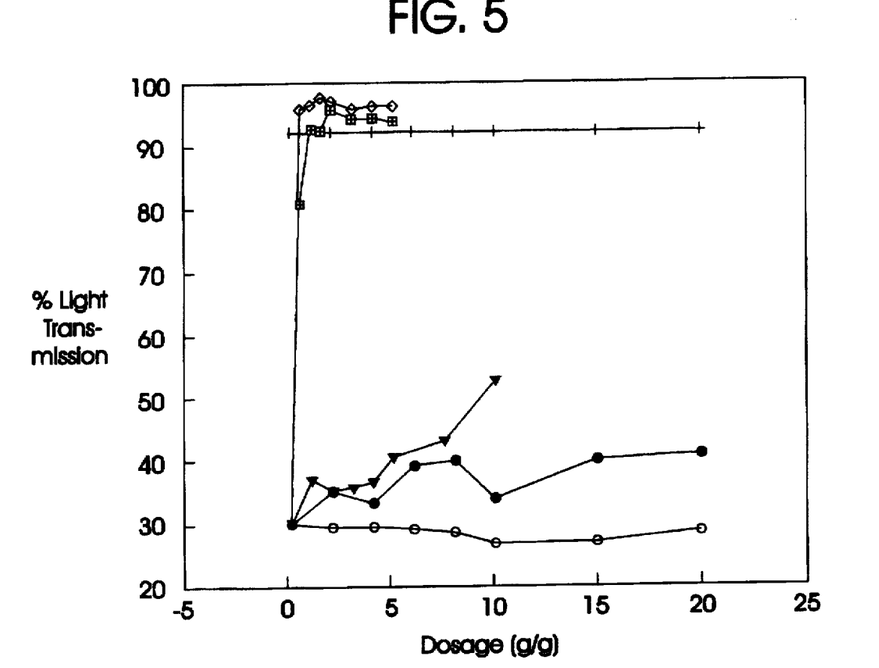
FIG. 5 is a graphical representation of the percent light transmission of clarified wastewater filtrates produced by contacting the wastewater to 0.13 g/g of carboxymethyl cellulose and varying dosages of different flocculating agents, including water soluble cellulose acetate (WSCA; "—o—"), cellulose acetate fibrets (CAF; "—□—"), cellulose triacetate fibrets (CTF; "—◊—"), cellulose triacetate fibers (CTFi; "—▼—"), and cellulose triacetate flakes (CTF1; "—●—"). The percent light transmission is plotted against the dosage in grams per total grams of protein in the wastewater sample. The control sample is also plotted as "—".
Figure 6:
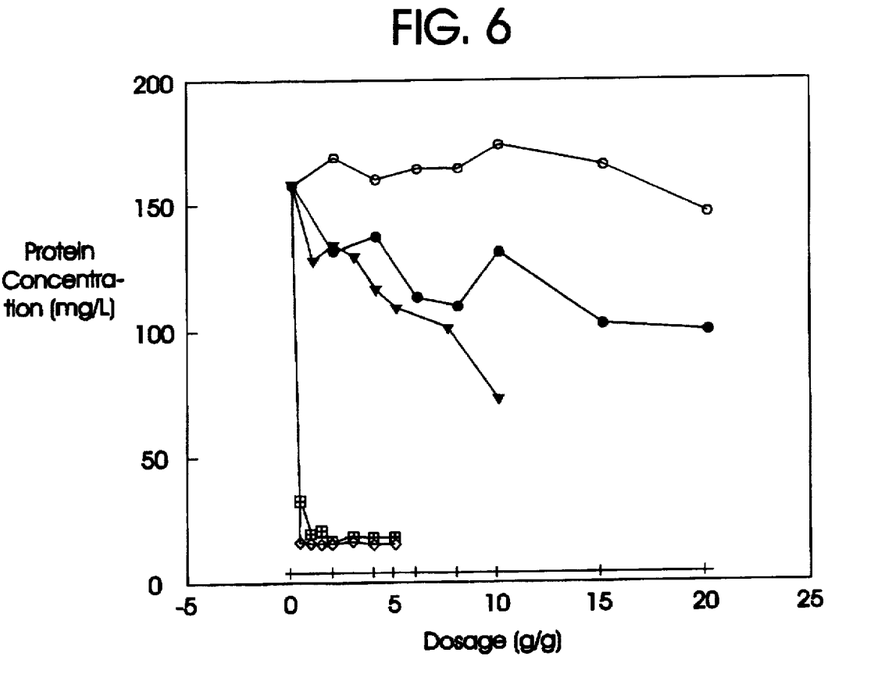
FIG. 6 is a graphical representation of the protein concentration of clarified wastewater filtrates produced by contacting the wastewater to 0.13 g/g of carboxymethyl cellulose and varying dosages of different flocculating agents, including water soluble cellulose acetate (WSCA; "—o—"), cellulose acetate fibrets (CAF; "—□—"), cellulose triacetate fibrets (CTF; "—◊—"), cellulose triacetate fibers (CTFi; "—▼—"), and cellulose triacetate flakes (CTF1; "—●—"). The protein concentration is plotted against the dosage in grams per total grams of protein in the wastewater sample. The control sample is also plotted as "—".

Wastewater treatment samples were clarified by adjusting the pH of the wastewater to 4.0, and contacting the wastewater to 0.13 g/g of CMC and varying amounts of different flocculating agents, including water soluble cellulose acetate, cellulose acetate fibrets, cellulose triacetate fibrets, cellulose triacetate fibers, and cellulose triacetate flakes. The contacting step is carried out for 2 hours, while shaking. The clarified filtrates were evaluated for %T and protein concentration. The %T results are reported in FIG. 5, and the protein concentration results are reported in FIG. 6. The results are compared with the control sample.

The results demonstrate that the highest %T and lowest protein concentrations are achieved with cellulose acetate fibrets and cellulose triacetate fibrets. In addition, the cellulose acetate fibrets and cellulose triacetate fibrets produced filtrates having as high, or higher %T and very nearly as low protein concentrations as the control. Better results were clearly obtained with the fibrets than any of the other flocculating agents tested.

EXAMPLE 5

Analysis of the Effectiveness of Fibrets and CMC

Figure 7:
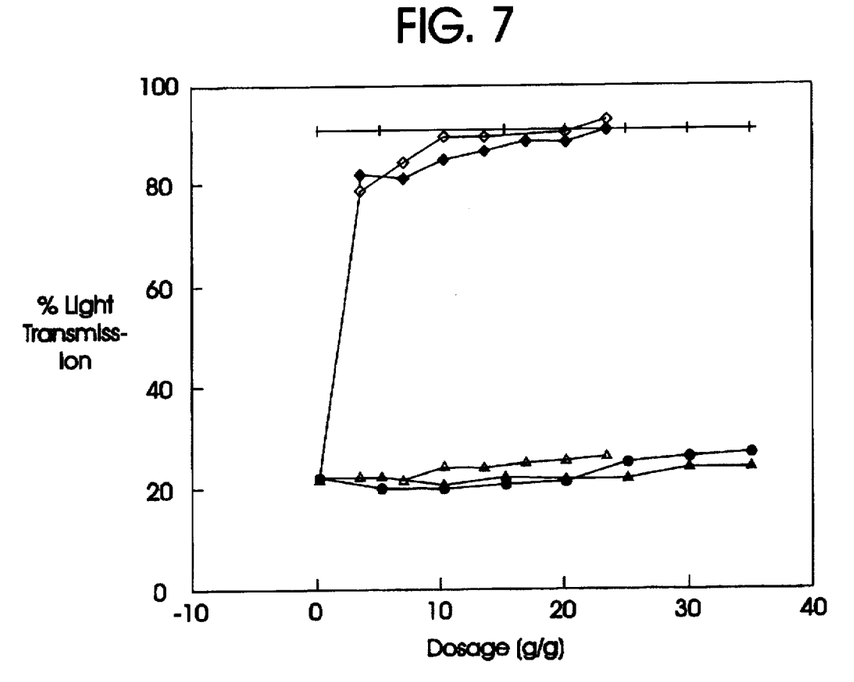
FIG. 7 is a graphical representation of the percent light transmission of clarified wastewater filtrates produced by contacting the wastewater to varying dosages of different flocculating agents, including water soluble cellulose acetate (WSCA; "—Δ—"), cellulose acetate fibrets (CAF; "—♦—"), cellulose triacetate fibrets (CTF; "—◊—"), cellulose triacetate fibers (CTFi; "—▲—"), and cellulose triacetate flakes (CTF1; "—●—"); in the absence of polyelectrolyte. The percent light transmission is plotted against the dosage in grams per total grams of protein in the wastewater sample. The control sample is also plotted as "—".
Figure 8:
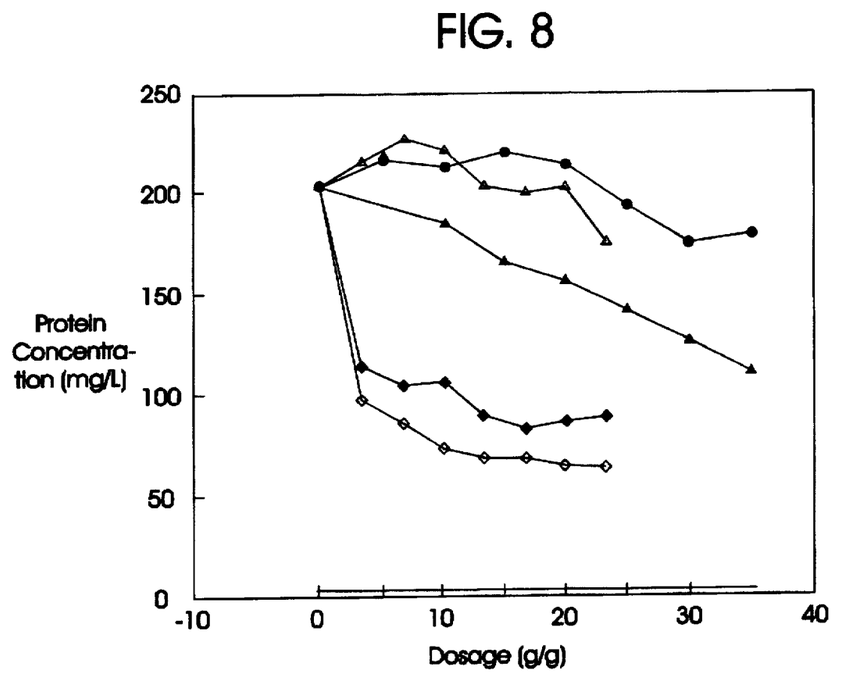
FIG. 8 is a graphical representation of the protein concentration (mg/l) of clarified wastewater filtrates produced by contacting the wastewater to varying dosages of different flocculating agents, including water soluble cellulose acetate (WSCA; "—Δ—"), cellulose acetate fibrets (CAF; "—♦—"), cellulose triacetate fibrets (CTF; "—◊—"), cellulose triacetate fibers (CTFi; "—▲—"), and cellulose triacetate flakes (CTF1; "—●—"); in the absence of polyelectrolyte. The protein concentration is plotted against the dosage in grams per total grams of protein in the wastewater sample. The control sample is also plotted as "—".

The pH of the wastewater treatment samples is adjusted to 4.0 by the addition of 1N hydrochloric acid. The wastewater samples are then contacted with varying amounts of different flocculating agents, including water soluble cellulose acetate, cellulose acetate fibrets, cellulose triacetate fibrets, cellulose triacetate fibers, and cellulose triacetate flakes, in the absence of a polyelectrolyte. The contacting step is carried out for 2 hours, during which the wastewater is stirred for the first hour and shaken for the second hour. The clarified filtrates were evaluated for %T and protein concentration. The %T results are reported in FIG. 7, and the protein concentration results are reported in FIG. 8. The results are compared with the control sample.

The results demonstrate that the highest %T and lowest protein concentrations are achieved with cellulose acetate fibrets and cellulose triacetate fibrets. In addition, the cellulose acetate fibrets and cellulose triacetate fibrets produced filtrates having very nearly as high %T as the control. The protein concentration achieved with cellulose acetate and cellulose triacetate fibrets is considerably better than that obtained using the other flocculating agents.

Comparing the results achieved using fibrets in combination with a polyelectrolyte described in Example 4, with the results achieve in the absence of polyelectrolyte demonstrates the effectiveness of the fibrets and the polyelectrolyte. Both the protein concentration and the %T of filtrates obtained by clarification with fibrets and polyelectrolyte are higher than the results achieved with fibrets alone. In particular, lower concentrations of fibrets were required to produce the same effect when the clarification method includes the polyelectrolyte.

EXAMPLE 6

Removal of Solubilized Proteins by Treatment with CMC Coated Fibrets

Figure 9:
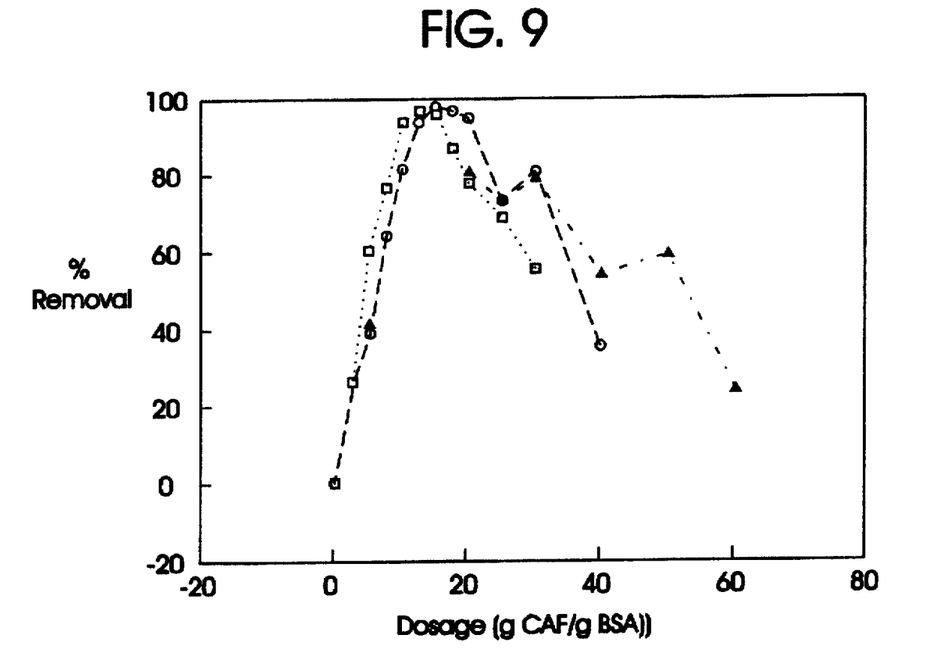
FIG. 9 is a graphical representation of the percent protein removal from a stock solution of bovine serum albumin (BSA) by contacting the solution to varying concentrations of carboxymethyl cellulose coated cellulose acetate fibrets. Percent protein removal is plotted against the dosage of cellulose acetate fibrets in grams per gram of BSA. In this graph, "—▲—" represents 0.25 mg/ml of initial protein concentration; "—o—" represents 0.5 mg/ml of initial protein concentration; and "...□..." represents 1.0 mg/ml of initial protein concentration.

BSA stock solutions in 5 mg/ml concentration are prepared having pH 4.2. Initial protein concentrations are 0.25, 0.5, and 1 mg/ml. Charge modified cellulose acetate fibrets are prepared by attachment of 1% CMC on the surface of the fibrets. Charge modified cellulose acetate fibrets are added in various dosages to evaluate protein removal from different initial concentrations of proteins. The fibrets are added to 2 ml of BSA solution and the solutions is shaken for 1 hour at room temperature. Suspensions are filtered through 20 µm frits, and filtrate is recovered for protein analysis by Dye binding assay. The results are reported in FIG. 9.

The results demonstrate that for 99% protein removal, a dosage of 15 g CMC coated fibrets per gram (equivalent to 0.15 g CMC/g) is required. By comparison, 0.2-0.25 g CMC/g is required to achieve 99% protein removal when only CMC is used as the flocculating agent. In addition, the results show that if the fibret/CMC dosage is increased above the optimum level, protein recovery decreases.

EXAMPLE 7

Comparative Example for Removal of Solubilized Proteins

Figure 10:
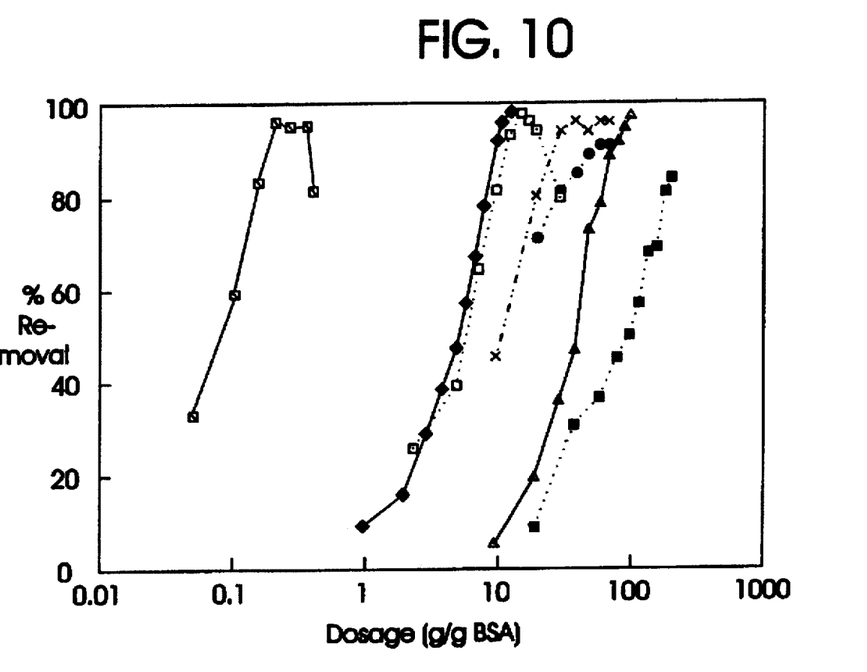
FIG. 10 is a graphical representation of the percent protein removal from a stock solution of bovine serum albumin (BSA) by contacting the solution to varying concentrations of different flocculating agents. The percent protein removal is plotted against the dosage of flocculating agents in grams per gram of BSA. In this graph, "—□—" represents carboxymethyl cellulose; "—♦—" represents SP SEPHADEX C50®; "...□..." represents carboxymethyl cellulose coated cellulose acetate fibrets; "—×..." represents cellulose triacetate fibrets; "...●..." represents cellulose acetate fibrets; "—Δ—" represents charged cotton fiber; and "...■..." represents cellulose acetate fibrets charged with bentonite.

The methods are carried out as described in Example 6, using a variety of different flocculating agents to evaluate protein removal using several different agents. FIG. 10 represents a comparison of flocculating agent dosages necessary for recovery of BSA from stock solutions. The flocculating agents tested include CMC alone, SP SEPHADEX C-50® (an ion exchanger), CMC coated cellulose acetate fibrets, cellulose triacetate fibrets, and cellulose acetate fibrets in the presence of salt, charged cotton fibers, and cellulose acetate fibrets having bentonite attached to the surface thereof.

The results demonstrate that dramatically better protein recovery achieved at lower dosages using the CMC coated fibret clarification method. These results demonstrate the efficiency of the inventive method for recovering solubilized proteins from solution.

EXAMPLE 8

Treatment with Cellulose Acetate Fibrets and CMC

Figure 11:
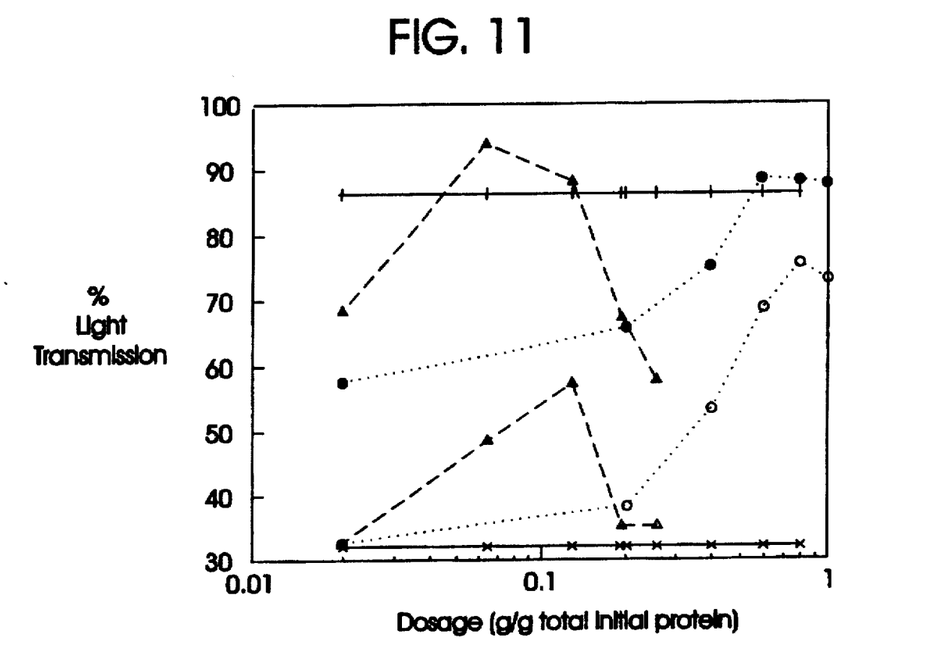
Figure 12:
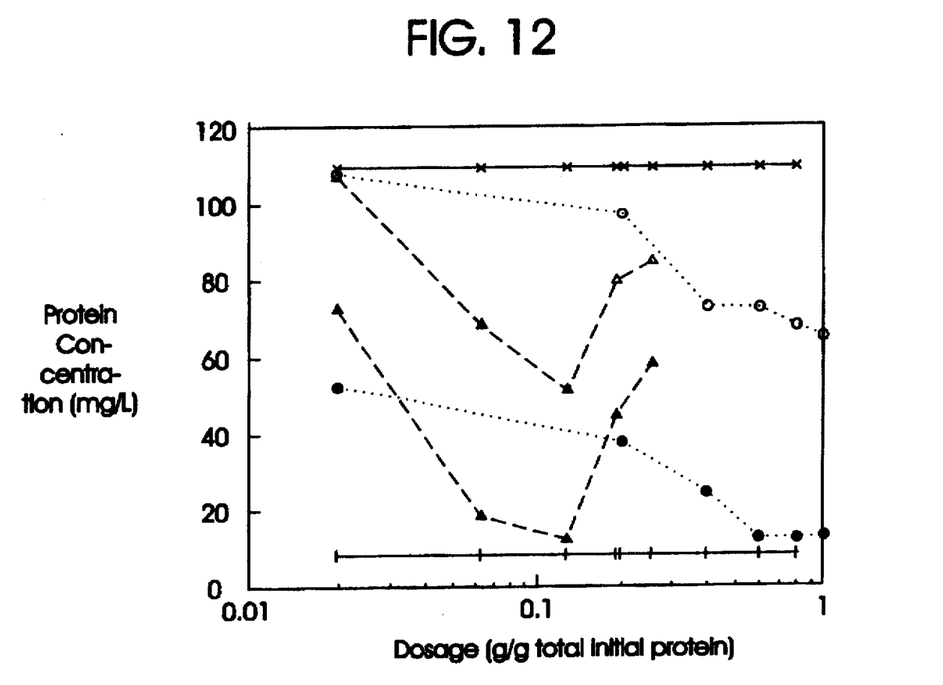

Wastewater samples (3 ml) are adjusted to pH 4.0 by addition of 1N hydrochloric acid. The wastewater samples are then contacted with varying amounts of cellulose acetate fibrets, stirred for 1 hour, and varying amounts of CMC, stirred briefly for 2 minutes and shaken for another hour. The solution is then filtered under vacuum through a 20 µm polyethylene frit using 3 cc syringes. The filtrate obtained is evaluated for water clarity and protein content, and the effects of varying concentrations of fibrets and CMC are analyzed. The results obtained in water clarity analysis are reported in FIG. 11. The results of protein concentration analysis are reported in FIG. 12.

The results indicate that treatment with fibrets or CMC alone did not produce a percent light transmission quite as high or protein concentration levels quite as low as the control. A dosage of 0.6 g/g (0.16 g/l) fibrets and 0.13 g/g (0.034 g/l) CMC produced water clarity and protein concentration levels equivalent to the control. The results further indicate that the application of cellulose acetate fibrets alone improves water clarity of the final filtrate at high dosages, and can remove about 50% of the total protein present in solution. The application of CMC alone enhances flocculation of solubilized proteins but the flocculants are not efficiently retained by the 20 µm pore filter. The simultaneous application of cellulose acetate fibrets and CMC gave a result in which lower dosages of both cellulose acetate fibrets and CMC achieved high performance results.

The foregoing is illustrative of the present invention and is not to be construed as limiting thereof. The invention is defined by the following claims, with equivalents of the claims to be included therein.

That which is claimed is:

1. A process for clarifying a turbid wastewater containing at least one contaminant selected from the group consisting of proteinaceous materials, fats, oils, and biological contaminants said process comprising:
   (a) contacting said wastewater to cellulose ester fibrets under conditions sufficient to flocculate said contaminant to form a flocculant-containing treatment suspension, and then
   (b) separating said flocculants from said treatment suspension to provide a clarified wastewater.

2. The process according to claim 1, wherein said turbid wastewater is selected from the group consisting of food processing wastewater, rendering wastewater, pharmaceutical manufacturing wastewater, chemical manufacturing and processing wastewaters, natural resource mining wastewater, and municipal wastewaters.

3. The process according to claim 1, wherein said step (a) of contacting comprises adding said cellulose ester fibrets to a vessel containing said turbid wastewater.

4. The process according to claim 1, wherein said step (a) of contacting comprises admixing said cellulose ester fibrets and said turbid wastewater.

5. The process according to claim 1, wherein said step (a) of contacting comprises contacting said turbid wastewater to cellulose ester fibrets selected from the group consisting of cellulose acetate fibrets and cellulose triacetate fibrets.

6. The process according to claim 1, wherein said step (a) of contacting comprises contacting said turbid wastewater to between about 1 mg and about 45 g of cellulose ester fibrets per liter of turbid wastewater.

7. The process according to claim 1, wherein said turbid wastewater contains proteinaceous materials, and said process comprises the step of adjusting the pH of said turbid wastewater to adjust the ionic charge of said proteinaceous materials prior to said step (a) of contacting.

8. The process according to claim 7, wherein said step of adjusting the pH of said turbid wastewater comprises lowering the pH of said turbid wastewater to provide a positive charge on said proteinaceous materials.

9. The process according to claim 7, wherein said step of adjusting the pH of said turbid wastewater comprises raising the pH of said turbid wastewater to provide a negative charge on said proteinaceous materials.

10. The process according to claim 1, further comprising the step of screening said turbid wastewater prior to said step (a) of contacting.

11. The process according to claim 1, wherein said step (b) of separating said flocculants from said treatment suspension comprises filtering said treatment suspension.

12. The process according to claim 11, wherein said step (b) of separating said flocculants from said treatment suspension is carried out by gravitational filtration.

13. The process according to claim 11, wherein said step (b) of separating said flocculants from said treatment suspension is carried out by vacuum filtration.

14. The process according to claim 1, wherein said step (b) of separating said flocculants from said treatment suspension comprises filtering said treatment suspension to provide a clarified wastewater having an optical density of not more than 0.9.

15. The process according to claim 1, wherein said step (b) of separating said flocculants from said treatment suspension comprises filtering said treatment suspension to provide a clarified wastewater having a percent light transmission of greater than about 40%.

16. The process according to claim 1, wherein said turbid wastewater contains proteinaceous materials, and said step (b) of separating said flocculants from said treatment suspension comprises filtering said treatment suspension to provide a clarified wastewater having a protein content of not more than about 1000 mg/l.

17. The process according to claim 1 further comprising the step (c) of chlorinating said clarified wastewater to reduce the number of microorganisms in said clarified wastewater.

18. A process for clarifying a turbid wastewater containing at least one contaminant selected from the group consisting of proteinaceous materials, fats, oils, and biological contaminants said process comprising:
    (a) contacting said turbid wastewater to a mixture of cellulose ester fibrets and a polyelectrolyte, under conditions sufficient to flocculate said contaminant to form a flocculant-containing treatment suspension, and then
    (b) separating said flocculants from said treatment suspension to provide a clarified wastewater.

19. The process according to claim 18, wherein said turbid wastewater is selected from the group consisting of food processing wastewater, rendering wastewater, pharmaceutical manufacturing wastewater, chemical manufacturing and processing wastewaters, natural resource mining wastewater, and municipal wastewaters.

20. The process according to claim 18, wherein said step (a) of contacting comprises adding said cellulose ester fibrets to a vessel containing said turbid wastewater.

21. The process according to claim 18, wherein said step (a) of contacting comprises admixing said cellulose ester fibrets and said turbid wastewater.

22. The process according to claim 18, wherein said step (a) of contacting comprises contacting said turbid wastewater to cellulose ester fibrets selected from the group consisting of cellulose acetate fibrets and cellulose triacetate fibrets.

23. The process according to claim 18, wherein said polyelectrolyte comprises a polymer containing cationic or anionic functional groups.

24. The process according to claim 18, wherein said polyelectrolyte is selected from the group consisting of carboxymethyl cellulose, polyacrylic acid, and chitosan.

25. The process according to claim 18, wherein said step (a) of contacting comprises contacting said turbid wastewater to between about 1 mg and about 45 g of cellulose ester fibrets and between about 0.1 mg and about 10 g of polyelectrolyte per liter of turbid wastewater.

26. The process according to claim 18, wherein said turbid wastewater contains proteinaceous materials, and said process comprises the step of adjusting the pH of said turbid wastewater to adjust the ionic charge of said proteinaceous materials prior to said step (a) of contacting.

27. The process according to claim 26, wherein said step of adjusting the pH of said turbid wastewater comprises lowering the pH of said turbid wastewater to provide a positive charge on said proteinaceous materials.

28. The process according to claim 26, wherein said step of adjusting the pH of said turbid wastewater comprises raising the pH of said turbid wastewater to provide a negative charge on said proteinaceous materials.

29. The process according to claim 18, further comprising the step of screening said turbid wastewater prior to said step (a) of contacting.

30. The process according to claim 18, wherein said step (b) of separating said flocculants from said treatment suspension comprises filtering said treatment suspension.

31. The process according to claim 18, wherein said step (b) of separating said flocculants from said treatment suspension is carried out by gravitational filtration.

32. The process according to claim 18, wherein said step (b) of separating said flocculants from said treatment suspension is carried out by vacuum filtration.

33. The process according to claim 18, wherein said step (b) of separating said flocculants from said treatment suspension comprises filtering said treatment suspension to provide a clarified wastewater having an optical density of not more than 0.9.

34. The process according to claim 18, wherein said step (b) of separating said flocculants from said treatment suspension comprises filtering said treatment suspension to provide a clarified wastewater having a percent light transmission of greater than about 40%.

35. The process according to claim 18, wherein said turbid wastewater contains proteinaceous materials, and said step (b) of separating said flocculants from said treatment suspension comprises filtering said treatment suspension to provide a clarified wastewater having a protein content of not more than about 1000 mg/l.

36. The process according to claim 18 further comprising the step (c) of chlorinating said clarified wastewater to reduce the number of microorganisms in said clarified wastewater.

37. A process for removing a contaminant selected from the group consisting of proteinaceous materials, fats, oils, biological contaminants and mixtures thereof from food processing wastewater, said process comprising:

(a) contacting said wastewater to a mixture of cellulose ester fibrets and a polyelectrolyte to form a flocculant-containing treatment suspension, and then (b) filtering said flocculants from said treatment suspension to remove said contaminant from said wastewater.

38. The process according to claim 37, wherein said food processing wastewater is selected from the group consisting of poultry processing wastewater, hog slaughterhouse wastewater, cattle slaughterhouse wastewater, whey processing wastewater, milk processing wastewater, cheese processing wastewater, fruit and vegetable processing wastewater, potato processing wastewaters, soya bean processing wastewaters, fruit and vegetable canning wastewater, fruit and vegetable juicing wastewater, grain processing wastewater, bakery wastewater, distillation wastewater, fermentation wastewater, and margarine processing wastewater.

39. The process according to claim 37, wherein said step (a) of contacting comprises adding said cellulose ester fibrets to a vessel containing said food processing wastewater.

40. The process according to claim 37, wherein said step (a) of contacting comprises admixing said cellulose ester fibrets and said food processing wastewater.

41. The process according to claim 37, wherein said step (a) of contacting comprises contacting said food processing wastewater to cellulose ester fibrets selected from the group consisting of cellulose acetate fibrets and cellulose triacetate fibrets.

42. The process according to claim 37, wherein said polyelectrolyte comprises a polymer having cationic or anionic functional groups.

43. The process according to claim 37, wherein said polyelectrolyte is selected from the group consisting of carboxymethyl cellulose, polyacrylic acid, and chitosan.

44. The process according to claim 38, wherein said step (a) of contacting comprises contacting said food processing wastewater to between about 1 mg and about 45 g of cellulose ester fibrets and between about 0.1 mg and about 10 g of polyelectrolyte per liter of food processing wastewater.

45. The process according to claim 39, wherein said food processing wastewater contains proteinaceous materials, and said process comprises the step of adjusting the pH of said food processing wastewater to adjust the ionic charge of said proteinaceous materials prior to said step (a) of contacting.

46. The process according to claim 45, wherein said step of adjusting the pH of said food processing wastewater comprises lowering the pH of said food processing wastewater to provide a positive charge on said proteinaceous materials.

47. The process according to claim 45, wherein said step of adjusting the pH of said food processing wastewater comprises raising the pH of said food processing wastewater to provide a negative charge on said proteinaceous materials.

48. The process according to claim 37, further comprising the step of screening said food processing wastewater prior to said step (a) of contacting.

49. The process according to claim 37, wherein said step (b) of separating said flocculants from said treatment suspension comprises filtering said treatment suspension.

50. The process according to claim 37, wherein said step (b) of separating said flocculants from said treatment suspension is carried out by gravitational filtration.

51. The process according to claim 37, wherein said step (b) of separating said flocculants from said treatment suspension is carried out by vacuum filtration.

52. The process according to claim 37, wherein said step (b) of separating said flocculants from said treatment suspension comprises filtering said treatment suspension to provide a clarified wastewater having an optical density of not more than 0.9.

53. The process according to claim 37, wherein said step (b) of separating said flocculants from said treatment suspension comprises filtering said treatment suspension to provide a clarified wastewater having a percent light transmission of greater than about 40%.

54. The process according to claim 37, wherein said turbid wastewater contains proteinaceous materials, and said step (b) of separating said flocculants from said treatment suspension comprises filtering said treatment suspension to provide a clarified wastewater having a protein content of not more than about 1000 mg/L.

55. The process according to claim 37 further comprising the step (c) of chlorinating said clarified wastewater to reduce the number of microorganisms in said clarified wastewater.

* * * * *